(12) United States Patent
Blick

(10) Patent No.: US 8,641,333 B2
(45) Date of Patent: Feb. 4, 2014

(54) CABINET ASSEMBLY BORE INDEXING TOOL AND METHOD

(76) Inventor: John Blick, Laguna Beach, CA (US)

(*) Notice: Subject to any disclaimer, the term of this patent is extended or adjusted under 35 U.S.C. 154(b) by 705 days.

(21) Appl. No.: 12/806,957

(22) Filed: Aug. 24, 2010

(65) Prior Publication Data

US 2012/0051866 A1     Mar. 1, 2012

(51) Int. Cl.
*B23B 47/28* (2006.01)

(52) U.S. Cl.
USPC ............................... 408/115 R; 279/83

(58) Field of Classification Search
USPC ............................... 408/115 R; 279/83
IPC ............................................. B23B 47/28
See application file for complete search history.

(56) References Cited

U.S. PATENT DOCUMENTS

| | | | | |
|---|---|---|---|---|
| 961,777 A | * | 6/1910 | Imboden | 279/83 |
| 1,097,153 A | * | 5/1914 | Wolgamood | 408/115 R |
| 1,335,347 A | * | 3/1920 | Moulds | 408/88 |
| 2,361,683 A | * | 10/1944 | Greenberg | 408/186 |
| 2,836,087 A | * | 5/1958 | Ehresmann | 408/115 R |
| 5,466,098 A | * | 11/1995 | Juang | 408/115 R |
| 5,601,295 A | * | 2/1997 | Baker | 279/46.5 |
| 5,807,036 A | * | 9/1998 | Lostlen | 408/97 |
| 5,947,652 A | * | 9/1999 | Wagner | 408/1 R |
| 2003/0123941 A1 | * | 7/2003 | Emerson | 408/103 |

FOREIGN PATENT DOCUMENTS

EP          677349 A1 * 10/1995

* cited by examiner

*Primary Examiner* — Eric A Gates
*Assistant Examiner* — Chwen-Wei Su
(74) *Attorney, Agent, or Firm* — Curtis L. Harrington; Harrington & Harrington

(57) ABSTRACT

A cabinet assembly bore indexing tool and method provides facilitated bore indexing and guided drilling, while an assembly method helps to make the tool almost foolproof while reducing overall cabinet construction time and raising cabinet quality. The tool uses approximate or nominal material thickness blocks referred to as drill bushing blocks and adjustable axial length spacer sleeves in a floating spacer assembly to locate the drilled bores at the nominal center of the horizontal members and correspondingly in the reciprocal location on the internal surface near the edge of the vertical members so that when assembled they go together in perfect alignment. The cabinet assembly bore indexing tool indexes from an edge or surface to ensure front exterior matching upon assembly of a resulting rectangular annular shaped member as the basic unit upon which cabinet construction is based.

10 Claims, 9 Drawing Sheets

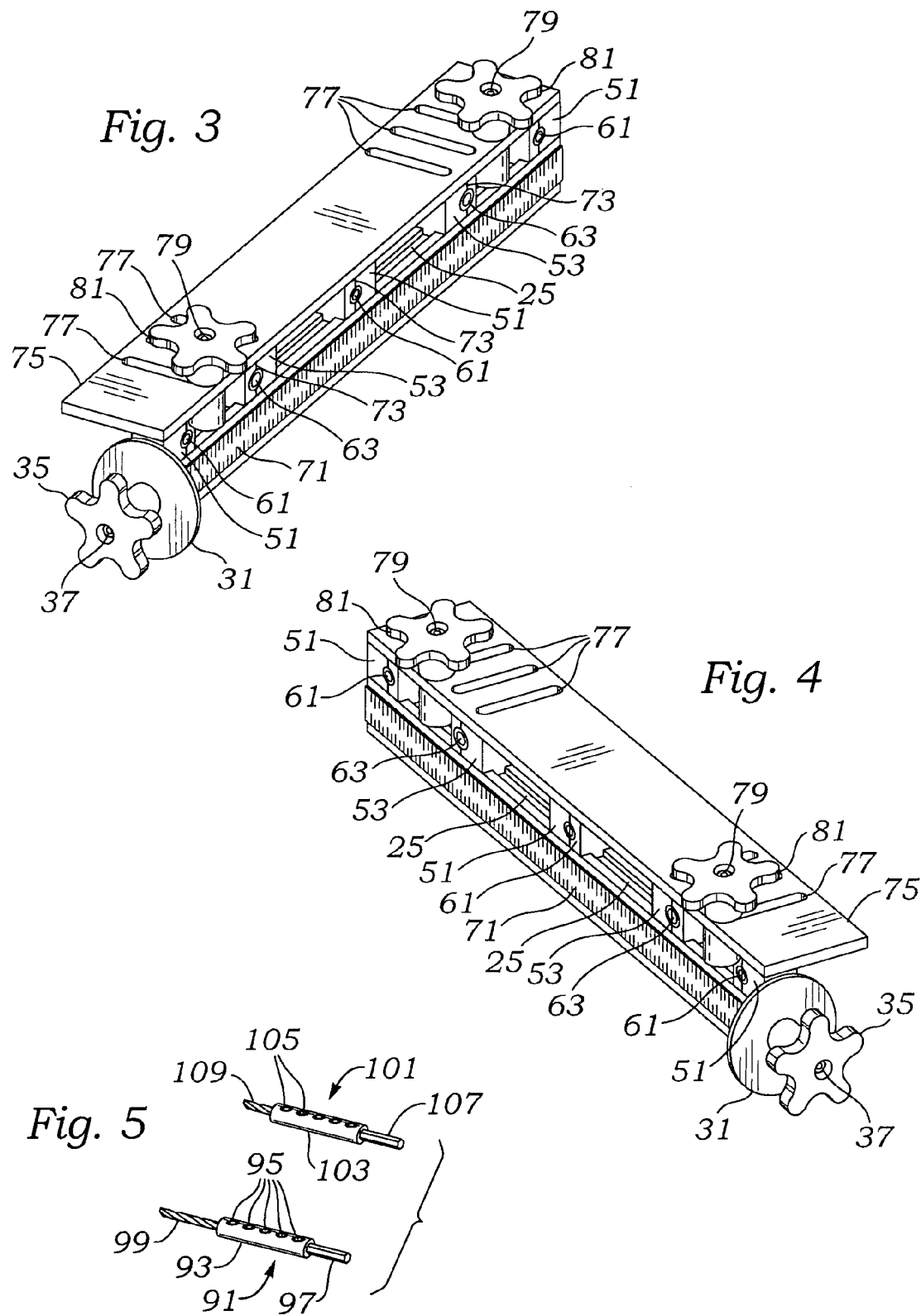

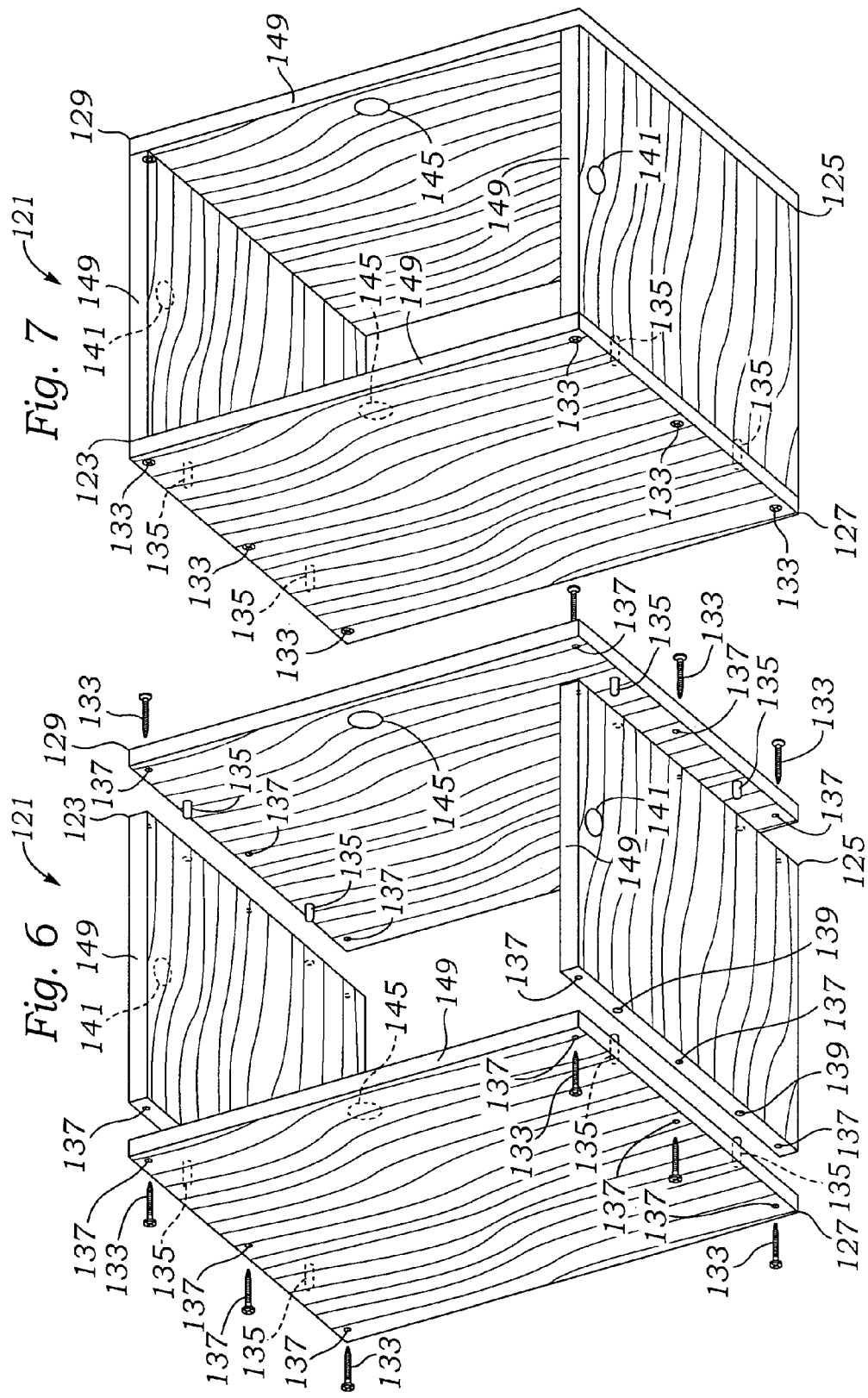

CABINET ASSEMBLY BORE INDEXING TOOL AND METHOD

FIELD OF THE INVENTION

The present invention relates to improvements in the field of cabinetry and more specifically a tool and method which permits a more precise, more consistent and more rapid method for alignment of cabinet wall and floor members, and which will produce a higher quality cabinet assembly for both base and upper cabinets.

BACKGROUND OF THE INVENTION

The field of cabinetry includes a number of skills and techniques in the production of various cabinet units. However, basic to nearly every sort of cabinet structure is the joining of the basic four planar members of the cabinet unit. These four planar members are constructed to make a rectangular annular shaped member which includes a first, usually upper horizontal member, a second, usually lower horizontal member, a first vertical wall joining the first and second horizontal members on one side and a second vertical wall joining the first and second horizontal members on the other side. The result is the basic annular, usually rectangular shaped, box open on two, usually a front and a rear side. Other reinforcements are usually added on the rear open side for stabilizing the integrity of the box, while a door, drawers or other openable and closable utility structure will appear at the front side as well as other stabilizing cross members.

Of course other processes are applied to cabinet structures, but the bulk of cabinet units begin with a rectangular box, whether the cabinet may include a lower unit and an upper unit, or an integrated upper and lower unit. Because this basic annular, usually rectangular shaped basic box unit is the basis for steps and structures employed thereafter, it is very important that this be constructed with as much strength and accuracy as possible. Expensive CNC (computer numerical controlled) or line boring machines are used for this purpose and provide for accurate placement of the drilled holes for fasteners and dowels. Dowels insure proper alignment and in the assembly process accurately locate and position the joining surfaces while screws are used to secure the panels one to the other in order to form the complete annular shaped box structure which is the basic building block for what becomes a "cabinet". In general, the use of dowels is important because of their potential to provide proper alignment and fit when the bores they utilized are properly formed. Other structures which are used for joining panels such as biscuits and loose tenons do not enable the type of accuracy of joining that a properly placed dowel can offer.

In general, in the case of the first and second horizontal members, they are usually located with dowels and engaged with threaded fasteners members which extend parallel with the plane of those members. In the case of the first and second vertical wall members, they are usually located outside the end edges of the first and second horizontal members and usually are engaged with dowels which interfit between blind bores drilled perpendicularly into the vertical members and are also engaged with threaded fasteners which extend perpendicularly into the vertical members and extend through and into the first and second horizontal members. In this way the first and second horizontal members can be strongly supported by the first and second vertical members by the stronger lateral sheer strength of the threaded fasteners and dowels.

The aforementioned arrangement of the basic annular, usually rectangular shaped box open on two sides, may be done under conditions of automated processing with a relative expensive computer numerically controlled (CNC) machinery or line boring machines. The CNC machining process enables computer controlled exact depth formation of the blind bores which will perfectly fit a dowel pin, and the formation of threaded fastener through bores and blind bores which will align perfectly at the time of assembly. Such computer controlled machining solution may be economically justifiable where a large number of uniform cabinets are being manufactured. But the cabinet industry is much more predominantly a custom design and manufacturing business. Cabinets are typically designed and constructed based upon available space and a combination of specific needs.

SUMMARY OF THE INVENTION

A cabinet assembly bore indexing tool and method provides facilitated bore indexing and guided drilling, while an assembly method helps to make the tool almost foolproof. The cabinet assembly bore indexing tool helps to accurately assemble and create an annular rectangular box which is the fundamental unit for any size cabinet, especially both the lesser depth wall cabinets typically mounted over the greater depth floor and wall supported cabinets. The tool is consistently accurate and uses approximate or nominal material thickness sleeves referred to as floating spacer assemblies to center the bores at the nominal center of the thickness of the material of the horizontal panels and to locate the bores at the correspondingly correct mating position in the surface and from the edges of the vertical panels to insure near perfect alignment of the edges of the cabinet panel members. Eliminating the need to locate the exact center of a bore with respect to the planar surfaces of a board of cabinet material further insures that the mating surfaces, when assembled, will be properly aligned.

As by example, where a three quarters of an inch thickness of material is used, a set of three quarter inch floating spacer assemblies is used to place the centers of the drilling accomplished by drilling through the drill bushings of the drill bushing blocks at the nominal center of the thickness dimensions of the horizontal members of the cabinet and at a correspondingly reciprocal position from the edge of the vertical members of the cabinet so as to assure near perfect alignment of the edges when the cabinet is assembled. It should be noted that absolute centering is not an issue nor a proper goal of placement, rather what is important is that a panel exactly match a mating panel. It is the external matching aesthetic which is important, and especially at the front face of the annular shaped box structure.

The cabinet assembly bore indexing tool and method of the present invention is driven by cost savings and quality of production, but another cost saving is had by the simplicity of construction of the tool itself. A main extruded member carries a pair of slots, one slot of which will engage a series of bushing blocks of an appropriate size for the dowels and threaded fasteners to be utilized to construct a cabinet basic annular box starting structure. A floating spacer assembly will allow the bushing blocks to be placed at the proper distance from an appropriate end edge or face of material. One or more drill chucks can be made readily available and having drill bit depth set collars are loaded with drill bits having a measured protrusion from the drill chucks, so that a resulting formed bore results from the use of the chucks as used in combination with the bushing blocks.

Of course, the correct diameter of formed bore must be selected which is optimum for the type and size of dowel and for the type and size of threaded fastener used to join the cabinet panels. Where a cabinet basic annular box starting structure will use a first diameter drill bit for a dowel bore, the dowel chuck need only have its depth of drill bit to be set one time for constructing that basic annular box starting structure, or a series of such basic annular box starting structures having the same dowel size. Likewise, where a single size and type of threaded connector will be used, the threaded connector need only have its depth of drill bit to be set one time. Put another way, nothing prevents a wider variety of diameters of threaded fastener or dowel to be used for a single base cabinet unit, but two sizes, one for the threaded fastener and one for the dowel, is expected to be adequate for most single base cabinet unit production.

In terms of process, once the thickness of material is known, and once the threaded fasteners and dowels are selected, the drill bushing blocks can be specified. Then the drill chucks having drill bit depth set collars are loaded and set with bit set to limit the depth of bore of the dowel bore or the threaded fastener bore as used in combination with the bushing blocks. A series of floating spacers are selected which are dependent on the material panel thickness and the tool is configured. The floating spacers are selected for the nominal thickness of the panel material to be used and cause the bores made by drilling through the drilling bushing blocks to be nominally centered in the thickness of the horizontal members and to be located in the surface of the vertical members at a correspondingly reciprocal position from the edge of the vertical members of the cabinet so as to assure proper alignment of the edges of both members when the cabinet is assembled. The only portion of the tool which will be altered during the assembly of the cabinet base unit will be a lateral indexing bar which is displaced to one side or the other depending upon whether the tool is used to drill into the horizontal members or the vertical members and depending upon which of each member is drilled. In addition, the cabinet assembly bore indexing tool can be used for locating and forming other bores, such as those relating to stabilizing cross members, vertical cross members known as "stretchers," and rear stabilizing panels which strengthen the rectangular annular shaped members constructed with the inventive tool and method described.

BRIEF DESCRIPTION OF THE DRAWINGS

The invention, its configuration, construction, and operation will be best further described in the following detailed description, taken in conjunction with the accompanying drawings in which:

FIG. 3 is a perspective view of a completely assembled cabinet assembly bore indexing tool as was seen in FIG. 2;

FIG. 4 is a perspective view of a completely assembled cabinet assembly bore indexing tool as was seen in FIG. 3, but with the lateral indexing bar shown shifted laterally to the right;

FIG. 5 is a perspective view of a set of two example drill chucks, with one being configured for deeper bores such as those used for threaded fasteners and another configured for shallow bores such as those used for dowels;

FIG. 6 is a perspective exploded view of a basic cabinet configuration is shown as a rectangular annular shaped member with horizontal members and wall members;

FIG. 7 is a perspective view of a basic cabinet configuration as shown in FIG. 6, but shown in assembled view;

DETAILED DESCRIPTION OF THE PREFERRED EMBODIMENT

Figures 1, 2:
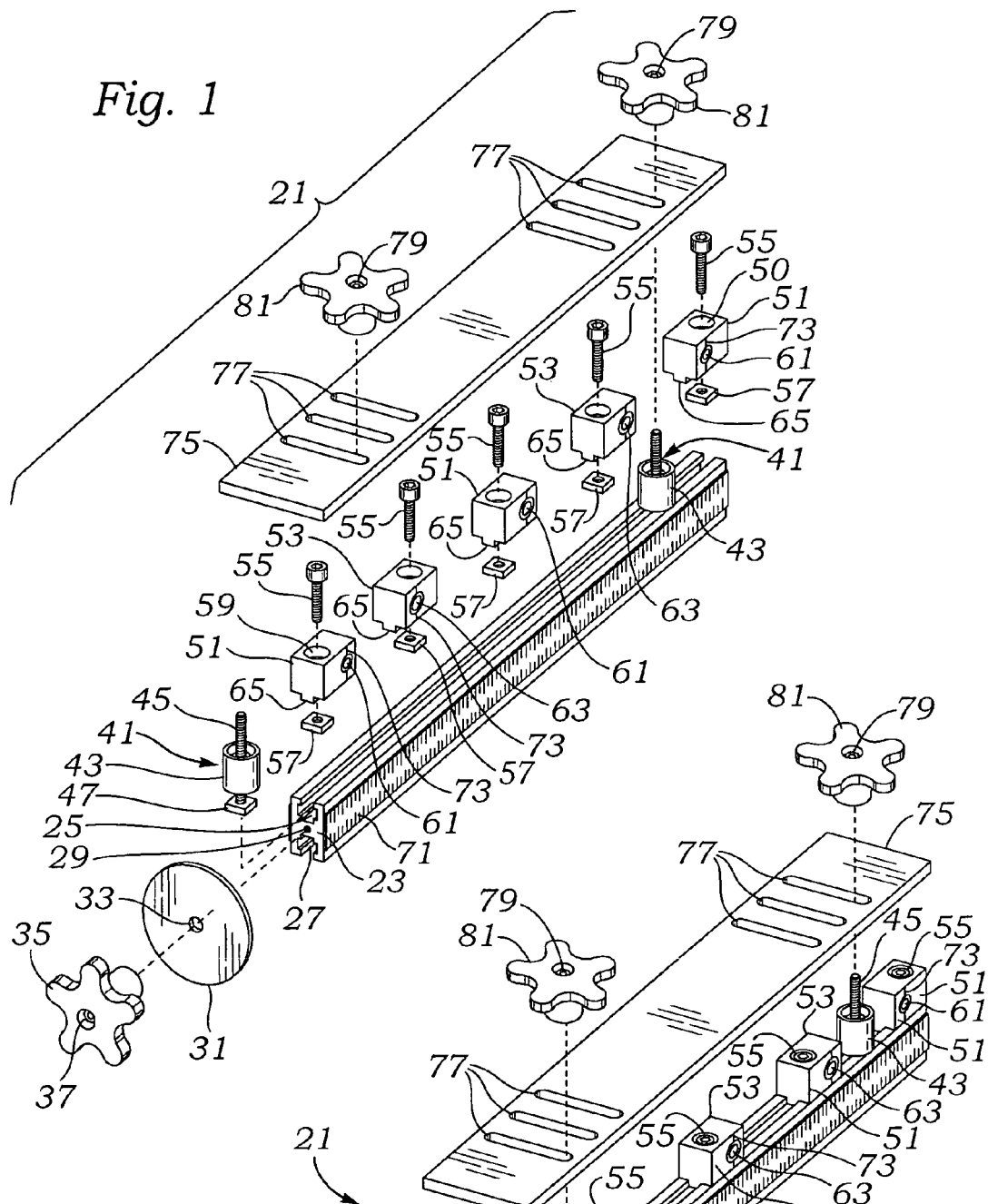
FIG. 1 is a perspective exploded view of the cabinet assembly bore indexing tool to facilitate identification of component parts, and for simplicity a shorter version suitable for a lesser depth of upper wall cabinet seen as having three threaded member bushing blocks and two dowel blocks.
FIG. 2 is a partially assembled and partially exploded view of the cabinet assembly bore indexing tool seen in FIG. 1 with the lateral indexing bar in exploded position in order to permit visualization of the remainder of the tool.

The basic four walled cabinet box, which may be technically referred to as a rectangular annular shaped member, in many uses, has an upper structure which may extend from the wall by about twelve inches, and a lower structure which may extend from the wall by about twenty four inches. The tool and method described may be any size and depth, but for simplicity and brevity will be introduced in one of its most basic, shorter embodiments. Referring to FIG. 1, a perspective view of the cabinet assembly bore indexing tool 21 illustrates a number of component parts which will be discussed in more detail. The cabinet assembly bore indexing tool 21 can be of any length and size, but is shown as it might be configured to work with upper cabinet structures of less depth, and shown in this manner only for simplicity of illustration. A slotted extrusion 23 shown is a double slotted extrusion and is shown to have an overall "H" shape. The upper and lower openings each have a pair of upper walls which terminate in angled portions turned toward each other to form a first slot 25 and a second slot 27. The slots 25 and 27 can accept structures sized to move axially through the slot, but which will be held in by the angled portion of the upper walls which can bear upward force and will tend to hold structures within the slots 25 and 27. In the explanation which follows, first slot 25 will be used, but it is understood that either of the first slot 25 or the second slot 27 can be used and it is expected that the slotted extrusion 23 may be completely bi-laterally symmetrical, but it need not be. In normal usage only one of the slots 25 and 27 are expected to be utilized.

At the end of the slotted extrusion 23, a threaded bore 29 is seen. Displaced from the end of the slotted extrusion 23 is an planar flat, circular indexing disk 31 having a central aperture 33. An index lock knob 35 is seen carrying a threaded fastener 37 which fits into threaded bore 29 to lock the indexing disk 31 firmly in place with respect to the end of the slotted extrusion 23. When locked in place, the circular indexing disk 31 insures that the very end of slotted extrusion 23 will be even with any material which the circular indexing disk 31 abuts on the same side of circular indexing disk 31 as the slotted extrusion 23.

In FIG. 1, between the slotted extrusion 23 and the indexing disk 31 is seen a floating spacer assembly 41 which includes a spacer sleeve 43 which may have an axial length of about the same thickness of cabinet material (not shown in FIG. 1) with which the cabinet assembly bore indexing tool 21 is used. Spacer sleeve 43 can be much longer to enable a series of formed bores to be appropriately positioned proper distance from an appropriate end edge or face of material. Floating spacer assembly 41 includes a threaded spacer fastener 45 which extends through the spacer sleeve 43.

Inside the spacer sleeve 43 (not shown in FIG. 1) is an axially reduced restriction which acts to center the threaded spacer fastener 45. Inside the spacer sleeve 43, a member loosely positioned with respect to such restriction such as a hexagonal nut (also not shown in FIG. 1) can optionally be used to prevent the threaded spacer fastener 45 from falling out of the spacer sleeve 43 during loading of the floating spacer assembly 41 into the first slot 25, or when making other adjustments to the cabinet assembly bore indexing tool 21. The bottom end of the threaded spacer fastener 45 is fitted with a nut 47 which is non rotatably attached to the threaded spacer fastener 45, such as by welding or applying a tight locking glue, or made in one piece by a machining process. The nut 47 is capable of sliding within, but not turning within first slot 25. An internal nut (not shown in FIG. 1) lies within the spacer sleeve 43 and acts only to prevent the threaded spacer fastener 45 from falling down and out of the spacer sleeve 43, and the threaded nut (not seen) rides axially loosely above the narrowest axial restriction. A second floating spacer assembly 41 is shown adjacent the upper right end of the slotted extrusion 23 in an position engaged with the first slot 25. The importance of the function of the floating spacer assemblies will be later shown.

To the right of the floating spacer assembly 41 a series of five rectangular blocks is shown, and including a set of three fastener bore bushing blocks 51, and a set of two dowel bore bushing blocks 53. The fasteners used in the bores of the fastener bores (not seen in FIG. 1) are threaded fasteners, but in describing the bores formed, the term "threaded" will be omitted to avoid any inference that the formed bores have any sort of formed thread, which they do not. Above each of the bushing blocks 51 and 53 is seen a threaded lock down fastener 55, with each lock down fastener 55 being associated with a single one of each of the bushing blocks 51 and 53. Below each of the bushing blocks 51 and 53 is a square nut 57 which is capable, like nut 47, of sliding within, but not turning within first slot 25. However, nuts 57 are not rotatably fixed with respect to their associated lock down fasteners 55 and the lockdown fasteners can be turned against their respective bushing blocks 51, 53 to cause them to be locked down against the interior portion of the first slot 25 of the slotted extrusion 23. Each of the bushing blocks 51, 53 have a counter bored opening 59 so that the threaded lock down fasteners 55 can be engaged with the nuts 57 within the first slot 25 to lock the bushing blocks 51, 53 down without any protrusion of such threaded lock down fasteners 55 above the surface of the drill bushing blocks 51, 53. The drill bushing blocks 51, 53 can be made of one piece of hardenable material with an integral hole made for a drill size if desired.

Each of the bushing blocks 51, 53 shown, however, show the inclusion of a respective bushing which is a bore oriented perpendicularly to the axial length of the threaded fasteners 55. Threaded fastener bushing blocks 51 include a fastener bore drill bushing 61, while dowel bore bushing blocks 53 include a dowel drill bushing 63. The drill bushings 61 and 63 are made of hardened steel and have an internal diameter to closely match the exterior diameter of any drill bit (not shown in FIG. 1) rotated within it. The hardening, close tolerance, and axial length of the drill bushings 61 and 63 will provide accurate drill guidance and enable them to enjoy long service and many repeated cycles of drilling support without significant wear.

The drill bushings 61 and 63 may be pressed into the bushing blocks 51 and 53 respectively. In the alternative, the drill bushings could be externally threaded into internally threaded bores in the bushing blocks 51 and 53 respectively. The drill bushings 61 and 63 can use any means to be well supported within their respective bushing blocks 51 and 53. In addition, each of the bushing blocks 51, 53 has a tongue 65 which fits within a first depth of the opening of the first slot 25 to insure that the axis of each of the drill bushings 61 and 63 is perpendicular to the length of the slotted extrusion thus insuring proper alignment of the formed bores. It can be seen that the fastener bore bushing blocks 51 include a threaded fastener drill bushing 61, while dowel bore bushing blocks 53 include a dowel drill bushing 63. The drill bushings 61 and 63 are made of hardened steel and have an internal diameter to closely match the exterior diameter of any selected drill bit (not shown in FIG. 1) can be accurately rotated within it. Note that the dowel drill bushings 63 may be slightly larger than the threaded fastener drill bushing 61. This need not always be the case, but for the example which will be cited, one good diameter for a dowel might be one quarter of an inch in diameter, while a good diameter for a threaded fastener or screw might be 5 mm. But, the actual sizes of drill bushings 61, 63 selected will be dependent on dowel size and the threaded fastener size and type selected by a cabinet maker.

Also seen in FIG. 1 is an optional ruler face 71 which may be mounted on the side of the slotted extrusion 23 and another ruler face 71 may be mounted on the other side. Each ruler face 71 will ideally be positioned to read from left to right in SAE or metric scale. Drill Bushing blocks 51 and 53 may have alignment markings 73 for ease of location with respect to ruler face 71. The alignment markings 73 will help users to more evenly distribute the drill bushing blocks 51 and 53 although an even distribution is not required.

At the top of the FIG. 1, and over the structures seen below is a lateral indexing bar 75. The lateral indexing bar 75 is a flat metal plate and may have a series of slots 77 through which the upper ends of the threaded members 45 may extend before engaging with a threaded bore 79 carried within a lateral indexing bar lock knob 81. Lock knobs 35 and 81 may be of the type that have an internal bore or aperture which can be friction fit with either a nut or a threaded member head. The lock knob 81 may be solid or formed as an integration of parts and can threadably inserted onto the spacer threaded member 35. Lock knobs 35 and 81 simply enable the user to make adjustments quickly without the need for a wrench or a hex driver. Lock knobs 35 and 81 lock the lateral indexing bar 75 against the spacer sleeves 43 which bear upon the upper part of the first slot 25 of the slotted extrusion 23. Note that the slots 77 are for having the lateral indexing bar 75 quickly change position laterally to enable the cabinet assembly bore indexing tool 21 to be used in a first position where bores are made parallel to cabinet material and a second position where bores are made perpendicular to cabinet material, as will be shown.

Lock knobs 81 secure the lateral indexing bar 75 to the floating spacer assembly 41. The axial length of the spacer sleeve 43, when the indexing bar 75 is secured, determines the position of the location of the bores of the drill bores of the drill bushing blocks 51 and 53 with respect to the lateral indexing bar 75. For example even though the bore bushing blocks 51 and 53 might be of a three quarter of an inch thickness, a one inch spacer sleeve 43 would raise the axis of the drill bores (axial centers of the bushings 61 and 63) so that the cabinet assembly bore indexing tool 21 might be used with a cabinet material of one and one quarter inch thickness, as but one of many examples. Likewise smaller bore bushing blocks 51 and 53 can be used with even smaller bushings 61 and 63 for use with cabinet material of a thickness of less than three quarters of an inch. Further, drill bushing blocks 51, 53 can be used with floating spacer assembly 41 spacer sleeve 43 to locate the bushing blocks 51 and 53 anywhere, and at a significant distance from the lateral indexing bar 75 because the floating spacer assembly 41 can have a variety of sizes of the spacer sleeve 43.

In practice, the threaded member bore bushing blocks 51 may be interspersed with the dowel bore bushing blocks 53 along the first slot 25. In the setup seen in FIG. 1, the user desires to use a set of two dowel bore bushing blocks 53 located evenly between set of three threaded bore bushing blocks 51. It is understood that a greater or lesser number of fastener bore bushing blocks 51 can be used, and that the dowel bore bushing blocks 53 could be located outside of the fastener bore bushing blocks 51, and so forth. Any combination is possible. In addition it is possible to use only dowels for proper alignment and then fasten the cabinet walls by using fine diameter nails driven in place pneumatically. Typically however, screws are used in conjunction with the locating and aligning dowels.

The purpose of the floating spacer assembly 41 and its spacer sleeve 43 is to secure the lateral indexing bar 75 and by its selected length (of the spacer sleeve 43) to cause the various drill bushing blocks 51 and 53 to locate the drilled bores at the nominal center of the horizontal members (not yet shown) and correspondingly in the reciprocal location on the internal surface near the edge of the vertical members (not yet shown) so that when assembled they go together in perfect alignment. The cabinet assembly bore indexing tool 21 may have a slotted extrusion 23 of any length, and longer lengths can support many more bushing blocks 51 and 53 especially for use with materials of greater dimension.

In setting up the cabinet assembly bore indexing tool 21, a user needs to have an idea of the configuration wanted for threaded fasteners and for dowels. Because of the repeatability and consistent pattern formed by selecting the spacing and locking down of the bushing blocks 51, 53, the exact location of these can be random or they can be planned for symmetry. Symmetry can provide some additional measure of organization and professional look to the extent that any exposed fasteners are seen. Inasmuch as the threaded fasteners, or any disruption they create can be seen from the outside wall of a cabinet, the fastener bore bushing blocks 51 may be preferably chosen for even distribution, and the dowel bore bushing blocks 53, which will form dowels which are not seen, can be randomly but preferably evenly and spaced apart, into a user specified arrangement.

As will be explained in greater detail, the indexing disk 31 will be placed at an outer edge of a board depth of cabinet material. It is also noted that for the nearest fastener bore bushing block 51, the user may desire to locate it quite close to the end of the slotted extrusion 23 and adjacent the indexing disk 31, but not so close to the edge of any material as to cause any such material to split. The same may be true for the fastener bore bushing block farthest located in the slotted extrusion 23. This normally means that the floating spacer assembly 41 may not necessarily be located outside of the outermost fastener bore bushing block 51 (or even an outermost dowel bore bushing blocks 53 if it were desired to be positioned at an outermost position). This would result in the placement of the floating spacer assemblies 41 generally in positions which may be available between two drill bushing blocks 51,53 of either type. The relationship between the floating spacer assembly 41 and the drill bushing blocks 51 and 53 is such that the length of the floating spacer assembly 41 sleeve 43 determines the location of the bores caused by the use of the drill bushings 61 and 63 in the drill bushing blocks 51 and 53 as referenced to the lateral indexing bar 75.

The existence of three or more slots 77 in the lateral indexing bar 75, helps the floating spacer assemblies 41 to be moved slightly to fit into a closest available slot 77 by movement of only a half of an inch or three quarters of an inch or so (depending upon the scale employed in constructing the cabinet assembly bore indexing tool 21. Even though the floating spacer assembly 41 has been described as having an upper internal nut to prevent fall through, these nuts (not shown) are not used to lock the floating spacer assembly 41 to the slotted extrusion 23 using the first slot 25. It is the lateral indexing bar lock knob 81 which operates in combination with its threaded bore 79 to engage the upper part of the threaded member 45 to cause the nut 47 to vertically engage the first slot 25 and which holds the floating spacer assembly 41 in place. It is the spacer sleeve 43 of the floating spacer assembly 41 which forms an exacting standoff between the lateral indexing bar 75 and the slotted extrusion 23. Since the slotted extrusion 23 has a series of locked down fastener bore bushing blocks 51 and dowel bore bushing blocks 53, the distance between the lateral indexing bar 75 and the fastener bore bushing blocks 51 and dowel bore bushing blocks 53 are also set. It is important that the indexing bar 75 be able to pass over indexing disc 31 and that the indexing bar 75 cannot be obstructed by indexing disc 31.

Referring to FIG. 2, a view similar to that in FIG. 1 is seen but with the cabinet assembly bore indexing tool 21 assembled except for the lateral indexing bar 75 and the lateral indexing bar lock knob 81 supporting their respective threaded bores 79. In the configuration shown, all of the bushing blocks 51, 53 are locked down, the floating spacer assemblies 41 are located between but slidably movable between their respective bushing blocks 51, 53.

Now, in assembling the lateral indexing bar 75 onto the threaded members 45, the floating spacer assembly 41 can be slid along the first slot 25 until the threaded member 45 aligns with one of the slots 77. Then the other the floating spacer assembly 41 can be slid along the first slot 25 as well as a sliding of the lateral indexing bar 75 with the first floating spacer assembly 41 threaded member 45 engaged, until the second threaded member 45 of the second floating spacer assembly 41 aligns with one of the slots 77 in the lateral indexing bar 75. Once this alignment is achieved the threaded members 45 can be located and put through the slots 77 and the lateral indexing bar 75 can still be displaced along the length of the slotted extrusion 23 with associated some back and forth displacement of the floating spacer assemblies 41. In other words, to the extent that the floating spacer assemblies 41 can move between adjacent bushing blocks 51 and 53 there will be some longitudinal play with respect to the slotted extrusion 23. However, once the lateral indexing bar lock knob 81 threaded bore 79 are engaged onto the threaded members 45 and the lateral indexing bar lock knobs 81 tightened, the lateral indexing bar 75 will be locked down against floating spacer assemblies 41 which will be locked down with respect to the slotted extrusion 23. This sets the spacing between the axial centers of the bushings 61 and 63 through the bushing blocks 51 and 53 and respect to the lateral indexing bar 75.

The completely assembled cabinet assembly bore indexing tool 21 is shown in FIG. 3. Note that the indexing disk 31 does not touch and cannot be interfered with by the lateral indexing bar 75. Therefore, no matter if the lateral indexing bar 75 overlies the indexing disk 31, or leaves quite a gap with respect to the indexing disk 31, the operation of the cabinet assembly bore indexing tool 21 will not be affected. Note the lateral indexing bar 75. In FIG. 3, and taking a viewpoint looking into the indexing disk 31, the lateral indexing bar 75 is shown shifted laterally to the left so that the threaded members 45 occupy the slots 77 at the opposite end of the slots 77 to which the lateral indexing bar 75 is shifted. The result is that the lateral indexing bar 75 is made to overlie a first side of the cabinet assembly bore indexing tool 21.

Likewise in FIG. 4, and again taking a viewpoint looking into the indexing disk 31, the lateral indexing bar 75 is shown shifted laterally to the right so that the threaded members 45 occupy the slots 77 at the opposite end of the slots 77 to which the lateral indexing bar 75 is shifted. The result is that the lateral indexing bar 75 is made to overlie a second side of the cabinet assembly bore indexing tool 21. This adjustability enables the cabinet assembly bore indexing tool 21 to be used with the indexing disk 31 abutting a front face of boards of cabinet material, and thus keying all of the displacements of the axes of the fastener bores and dowel bore bores from a common, matched surface, as will be explained.

Referring to FIG. 5, a set of two example drill chucks are shown, with one shown as being configured for deeper bores such as those used for threaded fasteners and another configured for shallow bores such as those used for dowels. Figure five illustrates a set of two chucks including a fastener bore forming chuck 91 having a set screw locking collet 93 with set screws 95. An adaptor, such as a hex adaptor 97 is rigidly attached to the locking collet 93, and is shown to enable use with a conventional drill or a driver. A drill bit 99 is seen as having been backed into the set screw locking collet 93 such that an exactly measured amount of drill bit 99 protrudes in front of the set screw locking collet 93. The cylindrical nature of the set screw locking collet 93 will cause it to stop its penetration and go no deeper than the threaded fastener drill bushing 61 will allow. The length that the drill bit 99 protrudes in front of the set screw locking collet 93 will be set by the desired depth of the threaded fastener added to the depth of the threaded fastener drill bushing 61 through which the drilling operation will occur. Once the rear end of the drill bit is inserted into the set screw locking collet 93, the set screws 95 will be tightened to lock the drill bit 99 into place.

Likewise a dowel bore forming chuck 101 having a set screw locking collet 103 with set screws 105 is seen. dowel bore forming chuck 101 has an adaptor extension 107 which is rigidly attached to the set screw locking collet 103. A drill bit 109 is seen as having been backed into the set screw locking collet 103 such that an exactly measured amount of drill bit 109 protrudes in front of the locking collet 103. As before, the cylindrical nature of the set screw locking collet 103 will cause it to stop its penetration and go no deeper than the dowel drill bushing 63 will allow. The length that the drill bit 109 protrudes in front of the set screw locking collet 103 will be set by the desired depth of the dowel penetration into the board cabinet material added to the depth of the dowel drill bushing 63 through which the drilling operation will occur. The drill bits 99 and 109 obtain the proper depth into the material by limit engaging against the bushing blocks 51 and 53 to the proper extend as controlled by the bodies of the collets 93 and 103.

Referring to FIG. 6, an exploded view of a basic cabinet configuration is shown as a rectangular annular shaped member 121 which includes a first, usually upper, horizontal member 123, a second, usually lower, horizontal member 125, a first vertical wall 127 joining the first and second horizontal members 123, 125 on one side and a second vertical wall 129 joining the first and second horizontal members 123, 125 on the other side. The first and second vertical walls 127 and 129, and the first and second horizontal members 123 and 125 will typically be rectangular volumes of material of any type which can be drilled and which has good strength.

This rectangular annular shaped member 121 is a basic structure which forms the fundamental unit of cabinet structure. In the exploded view, and for the first time a series of threaded fasteners 133 are seen by either their a protruding shank portions, or by their countersunk head portions. Also seen are a series of dowels 135, either by their protruding portions or in phantom. Threaded fasteners 133 are not shown in phantom because they are more numerous and might obscure some of the detail of FIG. 6. Also detailed are a set of fastener bores 137, and a set of dowel bores 139, many of which are not seen in FIG. 6 due to the point of view.

Also seen are a first series of indicators, including indicators 141 for the first and second horizontal members 123,125. A second series of indicators, including indicators 145 for the first and second vertical walls 127 and 129. Indicators 123 and 125 may be any structure which can provide a marked indication through the completed construction of the rectangular annular shaped member 121 and may include peel and stick circles available in any office supply store. The indicators 141 mark the first main sides of the first and second horizontal members 123 and 125, with the second main surfaces of the first and second horizontal members 123 and 125 opposite of the first main sides. The indicators 145 mark the first main sides of the first and second vertical walls 127 and 129 with the second main surfaces of the first and second vertical walls 127 and 129 opposite of the first main sides. These sides marked with indicators 141 and 145 are the sides upon which the cabinet assembly bore indexing tool 21 will vertically rest at the time that the cabinet assembly bore indexing tool 21 is used. Of course, the cabinet assembly bore indexing tool 21 can be oriented in many ways, however, the use of the lateral indexing bar 75 to be described combined with a process of keeping up with the sides of the material used will give accurate results which are far less likely to be in error.

Figure 8:
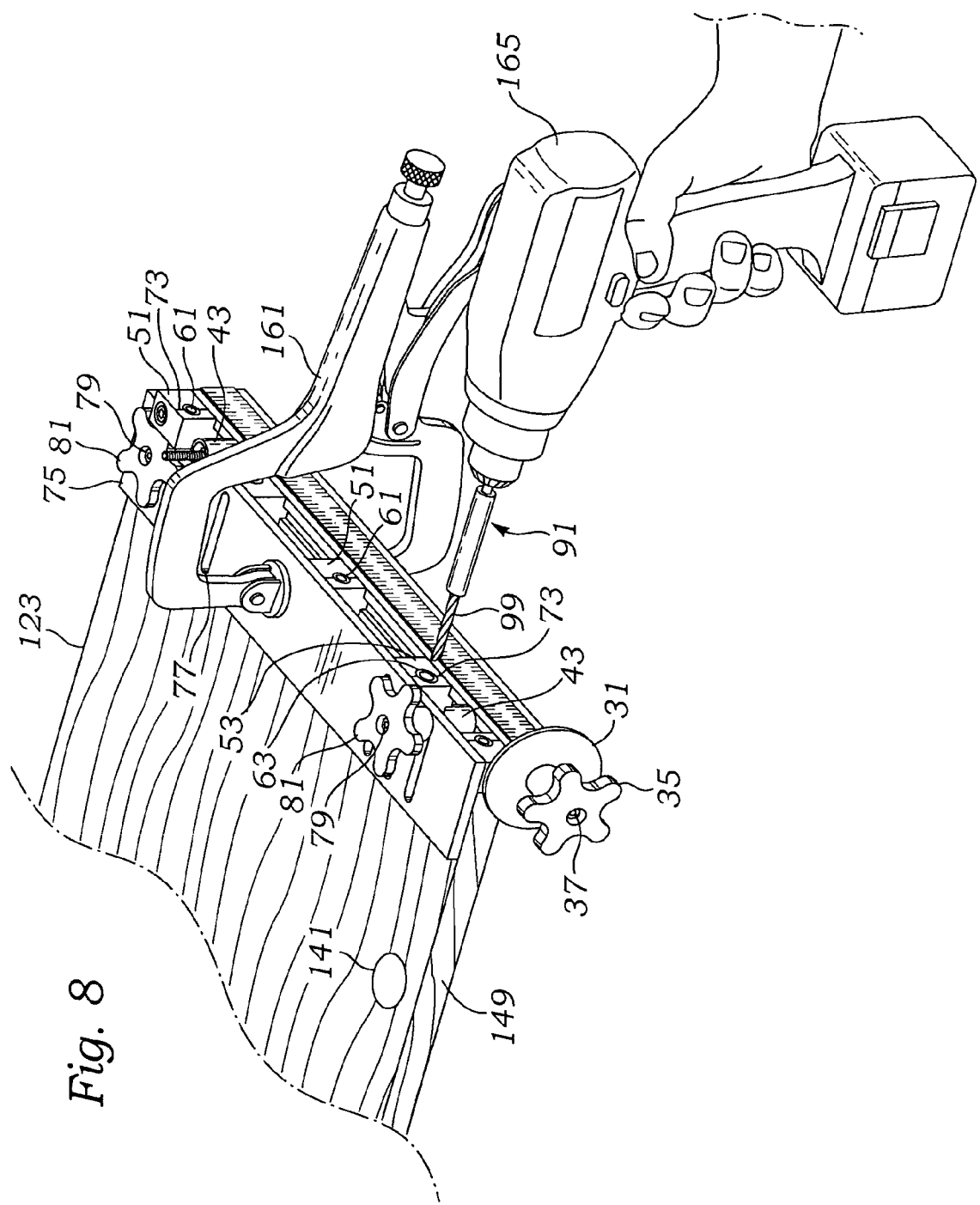
FIG. 8 is a perspective view of a first horizontal member of FIGS. 6 and 7 engaged at its right side by the cabinet assembly bore indexing tool of the present invention and illustrating a drilling operation into the edge of a horizontal member for forming fastener and dowel bores.

Referring to FIG. 7, the exploded assembly seen in FIG. 6 is shown in its assembled position. Referring to FIGS. 7 and 8, it is recognized that the first and second horizontal members 123 and 125 can be thought of as upper and lower load bearing shelves. First and second vertical walls 127 and 129 are seen to be in a position to support the first and second horizontal members 123 and 125. The manner of joining and supporting the first and second horizontal members 123 and 125 involves pin shear support from the series of threaded fasteners 133, and a series of dowels 135.

Continuing to refer to FIGS. 7 and 8, several objectives enhance the fundamental force and support relationships mentioned above. First, the vertical walls 127 and 129 can be nearly perfectly aligned and fit with respect to the first and second horizontal members 127 and 129. Second, where the board materials, including first and second horizontal members 123 and 125 and first and second vertical walls 127 and 129 are square, maximum strength and aesthetics depends upon a close, near-sealing fit. Third, and particularly as noted in FIG. 7, the meeting edges of first and second horizontal members 123 and 125 and first and second vertical walls 127 and 129 are not only aesthetically pleasing, but important for interfit of other structures upon which the rectangular annular shaped member 121 is based.

Continuing to refer to FIG. 8, it should be noted that the indicators 141 and 145 have in common that they are located at a front of the rectangular annular shaped member 121. Front can mean several things, including aesthetically where you want the closest matched edges to be because they are most prominently seen. But within the meaning of the process described, the front edge and the first side of the first and second horizontal members 123 and 125 and first and second vertical walls 127 and 129 are where the cabinet assembly bore indexing tool 21 will be placed for forming threaded fastener and dowel bores 137 and 139. Also note that although indicators 141 face externally outward with respect to rectangular annular shaped member 121, and that although indicators 145 face inwardly with respect to rectangular annular shaped member 121, that all of the indicators 141 and 145 are adjacent a front edge 149 of the rectangular annular shaped member 121.

The front edge 149 is the surface which will abut the indexing disk 31 during the drilling operations for forming the set of fastener bores 137 and set of dowel bores 139. The front edge 149 is used as an indexing reference for a number of reasons. First, for a given material, including the first and second horizontal members 123 and 125 and first and second vertical walls 127 and 129, the user should select the best edges for appearance and presentation. Second, for some cabinet materials, a front face 149 may have a decorated veneer laminate applied. Indexing or measurement should be performed against the front of the materials, including members 123 and 125 and walls 127 and 129 with indexing and to include abutment of the indexing disc 31 against such front face 149 so that there will be even matching of the overall formed rectangular annular shaped member 121.

The above points to a number of quality preferences in the initial selection of the first and second horizontal members 123 and 125 and first and second vertical walls 127 and 129. First and second horizontal members 123 and 125 should have perpendicular surfaces, and where the first main surfaces of each are indicated by the indicators 141, it is clear that the first main surfaces will show external to the rectangular annular shaped member 121, the surfaces and edges intended to be seen should be selected as the first main surfaces where the external appearance is of primary importance.

Further, since all indexing is had from the front edge 149 of the rectangular annular shaped member 121, the use of the cabinet assembly bore indexing tool 21 on the opposite edge faces of a given piece of material, such as first and second horizontal members 123 and 125 and first and second vertical walls 127 and 129 is helped by the ability of using one face of the slotted extrusion 23 against one side edge of material and the opposite face of the slotted extrusion 23 against the other side edge of material. The quickly releasable and laterally shiftable lateral indexing bar 75 facilitates this process, as will be shown. The prior discussion of FIGS. 6 and 7 will assist an understanding of the subsequent views illustrating the use of the cabinet assembly bore indexing tool 21.

Referring to FIG. 8, a view of the first horizontal member 123 engaged at its right side by the cabinet assembly bore indexing tool 21 is shown. First, in terms of orientation, the indicator 141 is seen adjacent the lateral indexing bar 75. Taking a position of looking into the index lock knob 35, lateral indexing bar 75 is shifted to the left, and over the first main side at an end portion of the first horizontal member 123. Note that the indexing disk 31 lies immediately adjacent the front edge 149 of the first horizontal member 123. All indexing is done from the front edge 149 and a selected side where the bores 137 and 139 are to be formed. The vertical first and second vertical walls 127 and 129 when assembled have their first main sides facing inward while the first and second horizontal members 123 and 125 when assembled have their first main sides facing outward.

Still referring to FIG. 8 the very most preliminary steps to achieve initial placement of FIG. 8 would first be a selection of a first horizontal member 123 having a nominal thickness, such as for example three-quarters of an inch material. Next, a corresponding set of fastener bore bushing blocks 51 and dowel bore bushing blocks 53 would be selected, and then loaded into the first slot 25 of the slotted extrusion 23. During the loading process, a pair of floating spacer assemblies 41 would be loaded into the first slot 25 of the slotted extrusion 23 along with the bushing blocks 51 and 53, in a position which would enable the floating spacer assemblies 41 to be able to locate and access the series of slots 77 of the lateral indexing bar 75.

Floating spacer assembly 41 has a spacer sleeve 43 having an axial height corresponding to the nominal thickness of the planar material used. These floating spacer assemblies cause the bore to be nominal centered in the planar material. The length of the floating spacer assembly 41 is selected to correspond to the nominal thickness of the planar material to be used in the construction of the cabinet. A longer floating spacer assembly 41 may be used for thicker material and will cause the bores produced by using the drill bushings 61, 63 of the drill bushing blocks 51, 53 to be located at the nominal center of the thicker material in the horizontal member 123, 125 material and correspondingly in the surface of the vertical member 127, 129 material at a reciprocal distance from the mating edges of the vertical members 127, 129 so as to insure near perfect alignment of the edges of the mating panels of the cabinet when assembled. Next, the loosening of the lateral indexing bar lock knob 81 (if necessary) to allow lateral indexing bar 75 to be moved to the left and locked into place as seen in FIG. 8. The indexing disk 31 is expected to always be in place and in the same position always, if this has not yet been done.

Preferably working off the end of a table, so that the slotted extrusion 23 extends downward with no interference, the cabinet assembly bore indexing tool 21 is urged toward the front edge 149 of the first horizontal member 123 until good and even contact is made between front edge 149 and indexing disk 31. Next, a locking plier type "C" clamp 161 is employed to provide significant force between the cabinet assembly bore indexing tool 21 and first horizontal member 123 so that any drilling operation will not cause any relative movement and that sufficient support for guiding the drilling operation will occur. An upper arm of the locking plier "C" clamp 161 is applied to a portion of the lateral indexing bar 75 which overlies the material of the first horizontal member 123 with the lower arm engaging the second side of the first horizontal member 123. A lower arm of the locking plier "C" clamp 161 could also be applied to include a table or layer upon which the work was being done.

The two chucks 91 or 101 are or have already been loaded with their respective drill bits 99 or 109 and to the proper depth to expose a desired depth of drill into first horizontal member 123 with the axial length of fastener bore bushing blocks 51 taken into account as previously described. A drill 165 is loaded with one of the two chucks 91 or 101, and in FIG. 8 a fastener bore forming chuck 91 is shown. Manual drilling commences through the threaded fastener drill bushing 61 of fastener bore bushing blocks 51, with the penetration into the material of the first horizontal member 123 being limited by engagement of the forward portion of the set screw locking collet 93 against the exposed surface of the threaded fastener drill bushing 61.

Once all of the set of fastener bores 137 are formed into the clamped setup shown in FIG. 8, the dowel bore forming chuck 101 and its pre-set drill bit 109 is loaded into the drill 165 and manual drilling commences through the dowel bushings 63 of dowel bore bushing blocks 53, with the penetration into the material of the first horizontal member 123 being limited by engagement of the forward portion of the set screw locking collet 103 against the exposed surface of the dowel bushings 63. Note also that the upper right side of lateral indexing bar 75 is partially broken away to show the relationship of the spacer sleeve 43.

Figure 9:
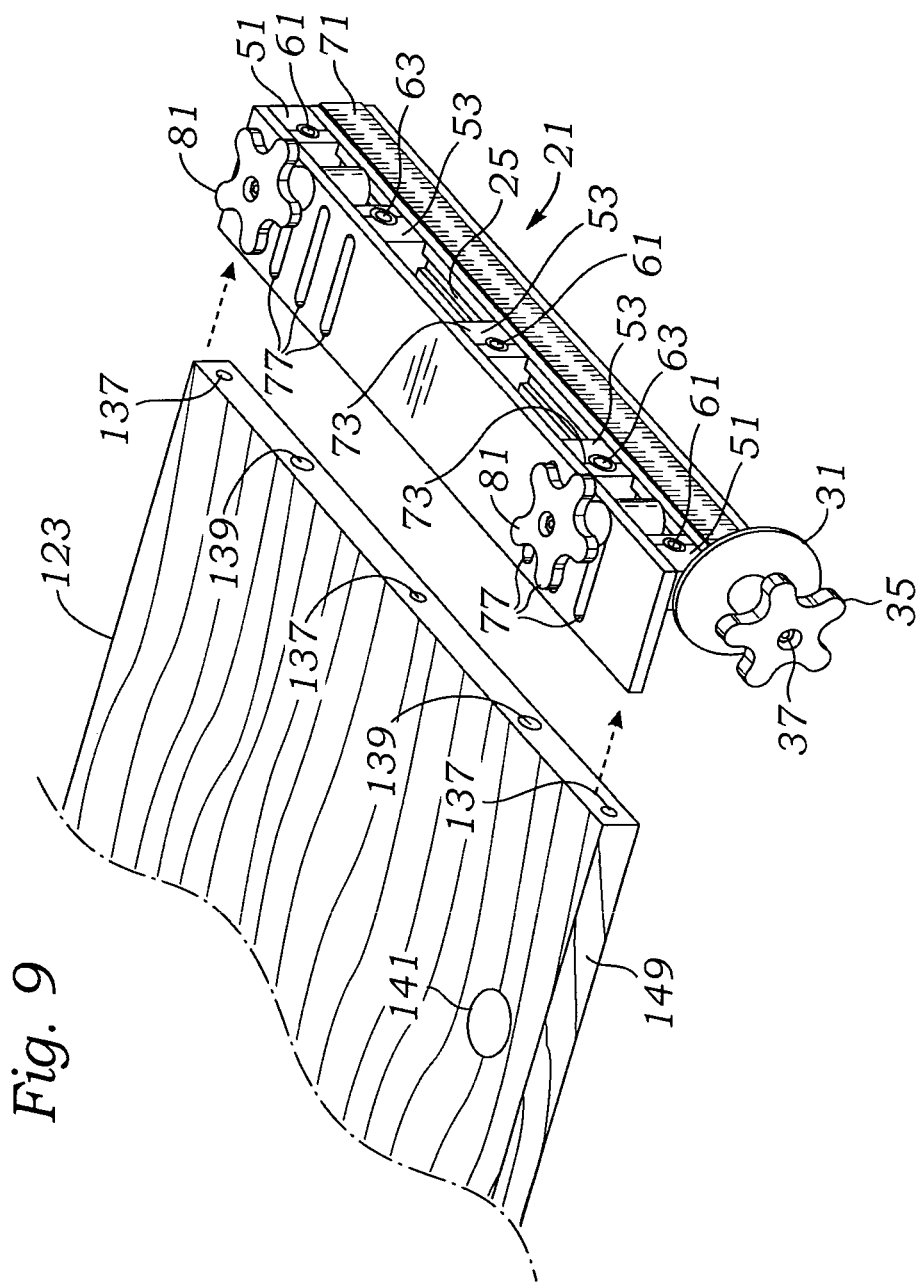
FIG. 9 is a perspective view of the removal of the cabinet assembly bore indexing tool from the right side of a first horizontal member and illustrating the set of threaded fastener bores and set of dowel bores resulting from the drilling operation.

Referring to FIG. 9, a perspective view of the right side of the first horizontal member 123 illustrates the removal of the cabinet assembly bore indexing tool 21 to expose the set of fastener bores 137 and set of dowel bores 139 which were seen in FIGS. 6 and 7. At this point, and after the drilling operation of the right side of the first horizontal member 123 is completed, the left side of first horizontal member 123 can be drilled. Once the "C" clamp 161 in FIG. 8 is removed, the cabinet assembly bore indexing tool 21 can be lifted off and adjusted for use at the other side of first horizontal member 123. To move drilling operation to the other side of first horizontal member 123, the lateral indexing bar 75 needs to be oppositely shifted. Again taking a frame of reference of looking into the index lock knob 35, the lateral indexing bar lock knob 81 and threaded bore 79 are loosened and the lateral indexing bar 75 is shifted to the right and then the lateral indexing bar lock knob 81 and threaded bore 79 are again tightened.

Figure 10:
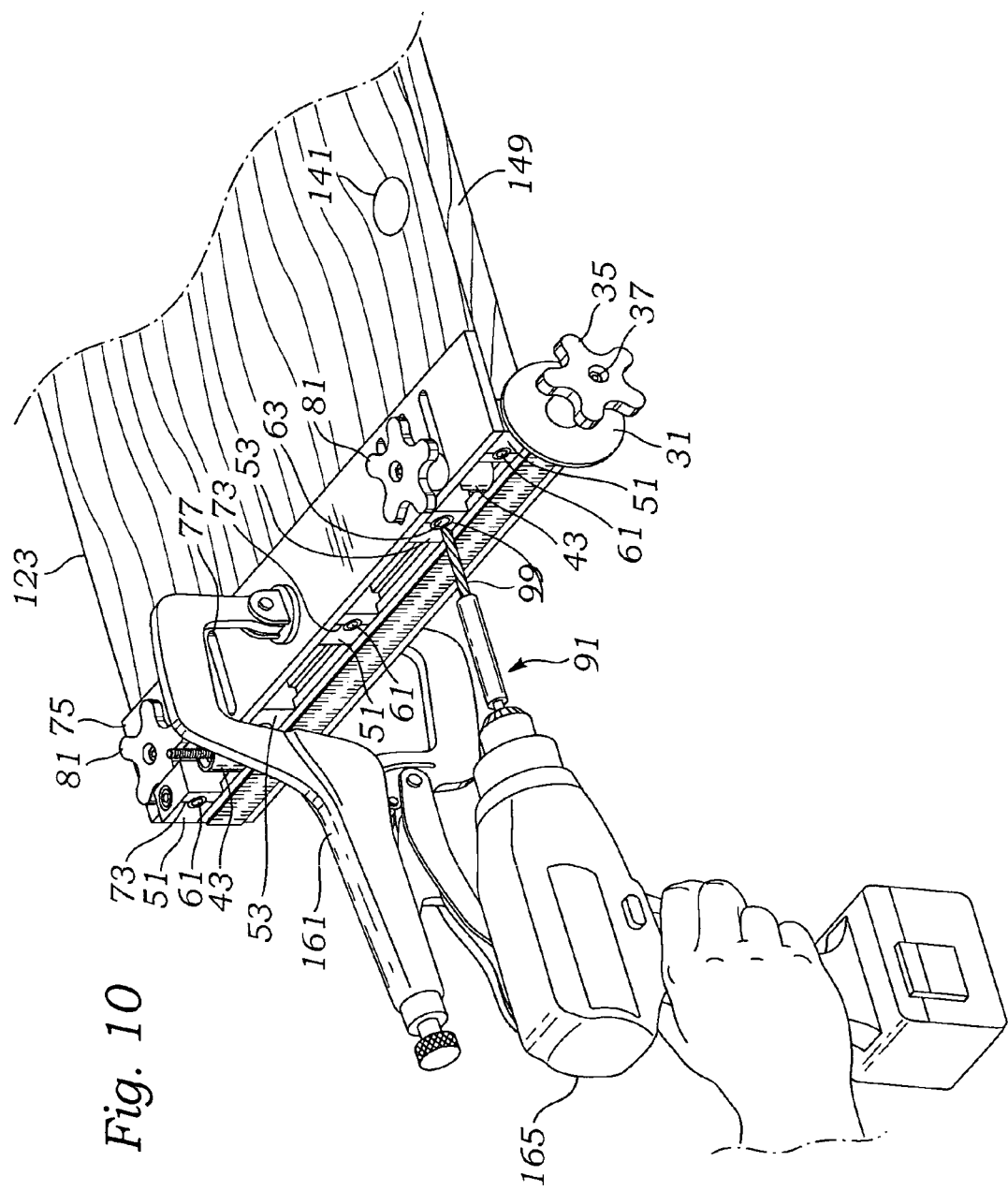
FIG. 10 is a perspective view of the left side of the first horizontal member of FIGS. 8 and 9 now engaged at its left side by the cabinet assembly bore indexing tool of the present invention and illustrating a drilling operation into the edge of a horizontal member for forming fastener and dowel bores.

Referring to FIG. 10, a perspective view of the placement of the cabinet assembly bore indexing tool 21 at the left side of first horizontal member 123 is shown. Generally it is seen to be a mirror image of the orientation and view seen in FIG. 8. Again working off the end of a table, so that the slotted extrusion 23 extends downward with no interference, the cabinet assembly bore indexing tool 21 is urged toward the front edge 149 of the first horizontal member 123 until good and even contact is made between front edge 149 and indexing disk 31. Then the "C" clamp 161 is employed to provide significant force between the cabinet assembly bore indexing tool 21 and first horizontal member 123 so that any drilling operation will not cause any relative movement and that sufficient support for guiding the drilling operation will occur. As described previously, the two chucks 91 or 101, unchanged from having been previously loaded with their respective drill bits 99 or 109 are used in the drilling operation. The result is a first horizontal member 123 having a series of fastener bores 137 and set of dowel bores 139 along both opposing side edges or ends which are identical to each other and both indexed from the front edge 149.

Figure 11:
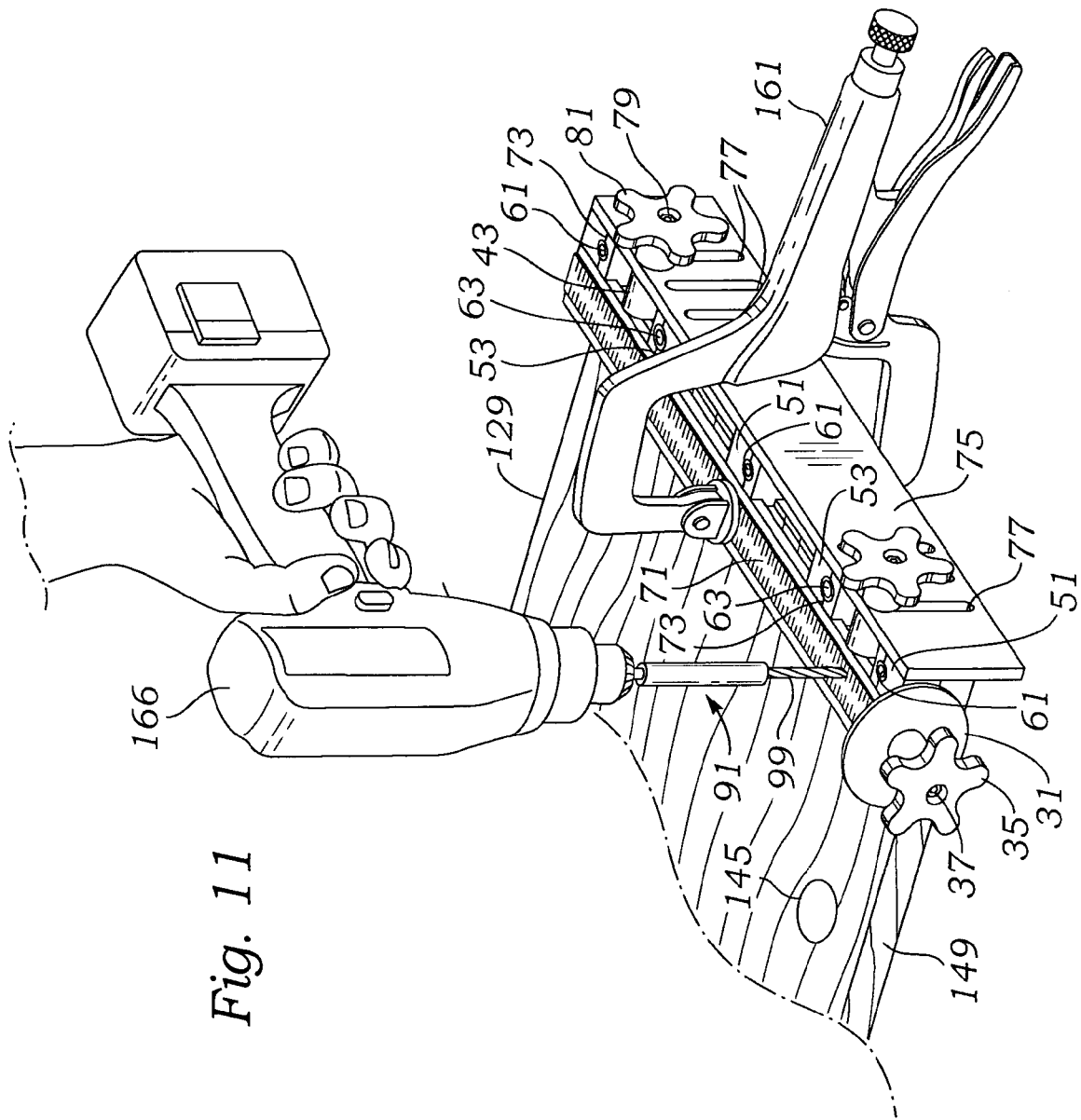
FIG. 11 is a perspective view of a second vertical wall member engaged adjacent its upper edge side by the cabinet assembly bore indexing tool of the present invention and illustrating a drilling operation into an inside surface near an edge of vertical wall member for forming fastener and dowel bores which will align with fastener and dowel bores formed in horizontal members seen in FIGS. 8 and 9.

Referring to FIG. 11, and once the drilling operation of the left side of the first horizontal member 123 is completed, the upper portion of the second vertical wall 129 may be processed. Note that in FIG. 11, as was the case in FIG. 10, and taken from a viewpoint looking into the indexing disk 31, the lateral indexing bar 75 is shown shifted laterally to the right. It is readily apparent that in proceeding with the drilling process, a complete rectangular annular shaped member 121 can be produced with only one shifting of the lateral indexing bar 75, or the processing can proceed sequentially on each end of each one of the first and second horizontal members 123 and 125 and first and second vertical walls 127 and 129. FIG. 11 illustrates the cabinet assembly bore indexing tool 21 at the upper end (taken with respect to FIGS. 6 and 7) of second vertical wall 129. Note that one of the ruler faces 71 is oriented upwardly and the other ruler face 71 which is not seen is oriented toward the first side of the second vertical wall 129 as indicated by the presence of the indicator 145. The indicator 145 identifies the front edge 149, and the indexing disk 31 is seen abutting the front edge 149.

The "C" clamp 161 is applied to the cabinet assembly bore indexing tool 21 in FIG. 11 slightly differently than was shown in FIGS. 8 and 10. Again working with the second vertical wall 129 in a horizontal position and extending beyond a work table (not shown) such that the lateral indexing bar 75 can extend downwardly, the "C" clamp 161 applies pressure to the slotted extrusion 23 at the ruler face 71 with the other arm of the "C" clamp 161 engaging the underside second side of the second vertical wall 129. The combination of the indexing disk 31 and the lateral indexing bar 75 enables the cabinet assembly bore indexing tool 21 to index itself exactly with respect to second vertical wall 129 before the "C" clamp 161 is applied.

The drilling process again occurs while the "C" clamp 161 is applied to the cabinet holding the member in place on the work table. As described previously, the two chucks 91 or 101, unchanged from having been previously loaded with their respective drill bits 99 or 109 are used in the drilling operation by engaging the corresponding ones of the threaded fastener drill bushing 61 and the dowel drill bushing 63 to make the exact same set of fastener bores 137 and set of dowel bores 139, but with one exception. The set of fastener bores 137 will extend through the material of the second vertical wall 129 and break through the other, second side, to enable threaded fasteners 133 to be threadably inserted from the second side of outside of second vertical wall 129 and through to the corresponding set of fastener bores 137 formed into the horizontal member 123 for example.

Referring again to FIG. 6, is readily seen that the same pattern of fastener bores 137 and set of dowel bores 139 is applied to the first and second horizontal members 123 and 125 and first and second vertical walls 127 and 129, all registered with respect to their front edges or front edge sides 149. Dowels 135 are placed in one of each opposing pair of dowel bores 139 and are used to align interfitting panel members, such as first horizontal member 123 and either of the first and second vertical walls 127 and 129, or such as the second horizontal member 125 and either of the first and second vertical walls 127 and 129. Once assembled, the first and second vertical walls 127 and 129 are secured to the first and second horizontal members 123 and 125 by mechanical fasteners including threaded fasteners 133, nails, dowels, glue and other attachment structures.

The result is a first horizontal member 123 having a series of fastener bores 137 which are blind bores, matching a set of fastener bores 137, which are through bores, of an adjacent second vertical wall. The dowel bores of both the first and second horizontal members 123 and 125 and the first and second vertical walls 127 and 129 should have a combined depth either matching or minutely slightly deeper than the length of the dowels 135. The set of fastener bores 137 and set of dowel bores 139 along both opposing side edges or ends of the material to be joined are identical to each other, even if they are unevenly spaced, but both indexed from the front edge 149. The first and second vertical walls 127 and 129 carry the same linear pattern of fastener bores 137 and set of dowel bores 139, again indexed from the front edge 149. This common indexing insures that when the rectangular annular shaped member 121 is formed, the front edges 149 will be even and matched.

As described previously, the two chucks 91 or 101, unchanged from having been previously loaded with their respective drill bits 99 or 109 are used in the drilling operations described. The drilling occurs against the threaded fastener drill bushing 61 and dowel drill bushing 63 as before to make another matched linear array, including a set of fastener bores 137 interspersed with a set of dowel bores 139. One aspect of the length of the series of threaded fasteners 133, perhaps with the thickness of material, such as first and second horizontal members 123 and 125 and first and second vertical walls 127 and 129 may be considered.

As has been discussed, if a much thicker pair of first and second vertical walls 127 and 129 were used, the cabinet assembly bore indexing tool 21 as described would need no additional compensating adjustments other than perhaps a floating spacer assembly 41 having a greater axial length spacer sleeve 43. The axial internal diameter of the bushings 61 and 63 somewhat dictate the physical size of the bushing blocks 51 and 53. A set of miniature size bushing blocks 51 and 53 can be used for forming much smaller size fastener bores 137 and dowel bores 139 for thinner material but will require correspondingly shorter spacer sleeves 43 to bring the fastener bores 137 and dowel bores 139 within a reduced distance of the lateral indexing bar 75. Further, cabinet assembly bore indexing tool 21 and its components can be constructed in any size.

Figure 12:
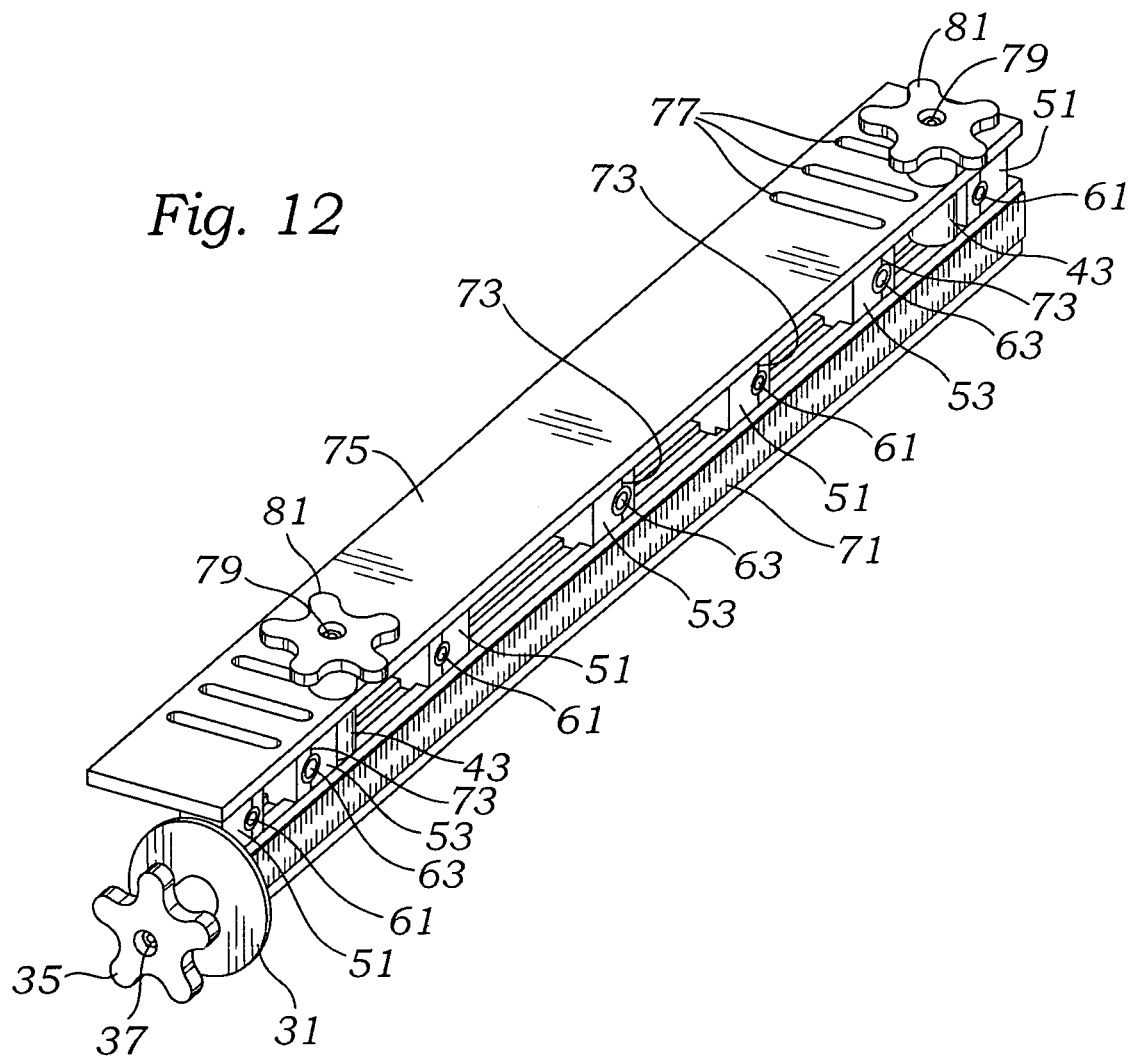
FIG. 12 is a perspective view of a longer version of the cabinet assembly bore indexing tool such as may be used to build a basic cabinet box or rectangular annular shaped member of greater depth and which in this case is shown supporting seven bushing blocks, including three for dowels and four for forming bores for threaded fasteners; and, FIG. 13 is a schematic view Referring to FIG. 13, a view looking into a spaced apart relationship between a horizontal member and a vertical wall 1 with the cabinet assembly bore indexing tool in a position indicating graphically how it produces bores with respect to an outside surface of a horizontal member and an edge surface of a vertical wall member with respect to its lateral indexing bar.

Referring to FIG. 12, a perspective view of a longer version of the cabinet assembly bore indexing tool 21 is seen with a greater number of fastener bore bushing blocks 51 (four) and a greater number of dowel bore bushing blocks 53 (three) and which is shown supporting seven bushing blocks 51 and 53 in order to facilitate a larger number and pattern of fastener bores 137 and dowel bores 139 to facilitate the formation of a basic cabinet box or rectangular annular shaped member of greater depth. A longer cabinet assembly bore indexing tool 21, and thus longer slotted extrusion 23 and indexing bar 75 may be provided for deeper (greater dimension from the front of a cabinet to a rear side of a cabinet) cabinet material, including first and second horizontal members 123 and 125 and first and second vertical walls 127 and 129 which are thicker and longer.

Figure 13:
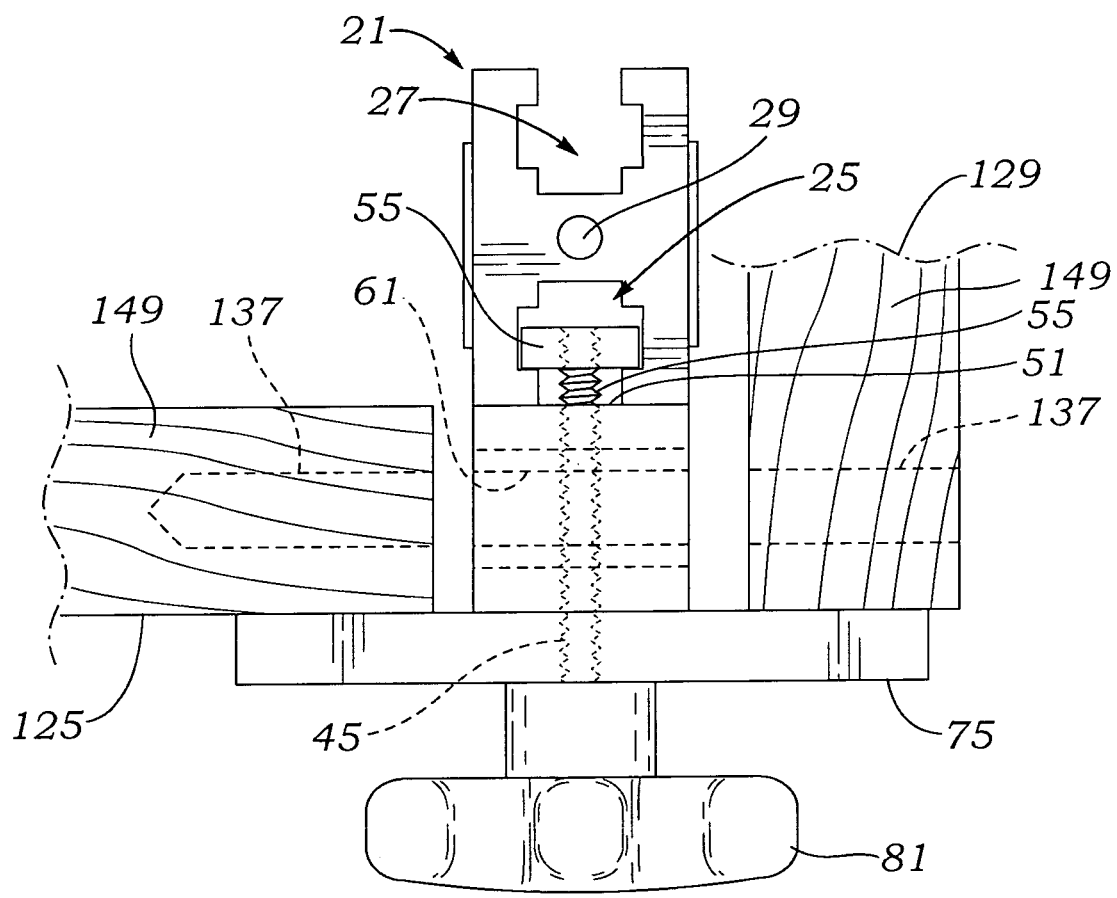

Referring to FIG. 13, a view looking into a spaced apart relationship between the second horizontal member 125 and the second vertical wall 129 with the cabinet assembly bore indexing tool 21 in a position indicating in another manner how indexing tool 21 works is shown. As was shown before, in a typical cabinet configuration, the horizontal members 123 and 125 abut the insides of the first and second vertical walls 127 and 129. As such, the alignment desired is between the lower planar extend of the horizontal members 123 and 125 and the terminal ends of the second, usually lower, horizontal member 125 first and second vertical walls 127 and 129. Focussing in upon the second horizontal member 125, and lower terminal end of the vertical wall 129, it can be seen that the use of the lateral indexing bar 75 against both the terminal end of the lower terminal end of the vertical wall 129, causes a set of aligned fastener bores 137 in both the horizontal member 125 and the second vertical wall 129. When the cabinet assembly bore indexing tool 21 is removed and when the second vertical wall 129 is moved toward the second horizontal member 125, fastener bores 137 will be aligned in such a way that the lower surface of the second horizontal member 125 will be flush with the lower end of the second vertical wall 129. The movement of the lateral indexing bar 75 provides convenience and clearance for the approach of the drill 165 and the collets 93 and 103.

The use of the indicators 141 and 145 is merely a surface selection device for the convenience of the constructor, since the relationships seen herein are confusing to reconstruct mentally when trying to construct the rectangular annular shaped member 121. FIG. 13 illustrates the lateral indexing bar 75 in a middle position and bearing against both the end of the second vertical wall 129 and lower surface of the second horizontal member 125. However, when each of the second vertical wall 129 and second horizontal member 125 are processed, it is practical and likely for the cabinet assembly bore indexing tool 21 to be set atop the material being treated. In the case of second horizontal member 125 it is the lateral indexing bar 75 which sits atop of the material. In the case of second vertical wall 129, the cabinet assembly bore indexing tool 21 will lie atop the second vertical wall 129 with the lateral indexing bar 75 extending downward and over the end of the second vertical wall 129. This is the reason for the indicators 141 on the first and second horizontal members 123 and 125 to face outward, and the reason for the indicators 145 on the first and second vertical walls 127 and 129 to face inward. The use of the key taught in this specification will enable a cabinet constructor to easily select the proper sides without having to mentally recall the overall details of construction.

While the present invention has been described in terms of a device and system used in conjunction with the formation of a fundamental cabinet structure, and in particular a cabinet assembly bore indexing tool and system which enables quick and easy matched location of fastener bores and dowel bores into meeting points adjacent the edges of vertical walls and horizontal members of the material making up the fundamental cabinet structure, especially a rectangular annular shaped member.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A cabinet assembly bore indexing tool comprising:
 a linear body having a main linear axis and having a first end and a second opposite end, a first side having a slot, and an opposite second side, a first lateral side and an opposite second lateral side;
 a plurality of bushing blocks securable at user selected locations along the slot, each bushing block supporting a bushing having a bushing axis perpendicular to the main linear axis of the linear body;
 a spacer assembly securable within the slot of the linear body;
 a lateral indexing bar securable to the spacer assembly, the indexing bar wider than the linear body and securable with the spacer assembly at a user selectable first position laterally overlying the first side of the linear body and even with the second side of the linear body and a user selectable second position laterally overlying the second side of the linear body and even with the first side of the linear body.

2. The cabinet assembly bore indexing tool as recited in claim 1 and further comprising a ruler face carried on one of the first and second lateral sides.

3. The cabinet assembly bore indexing tool as recited in claim 1 and wherein at least one of the bushing blocks further comprises:
   a bushing block body having a first side directed away from the linear body, a second side having a protruding tongue fitting at least partially into the slot of the linear body, the bushing block body having a securing through bore between the first and second sides, the bushing block body having a third side facing away from the linear body in the same direction as first lateral side of the linear body and having a fourth side facing away from the linear body in the same direction as second lateral side of the linear body, the bushing block body having a bushing bore perpendicular to the main linear axis of the linear body between the third and fourth side of bushing block body, and spaced apart from the securing through bore a fifth side, and an opposite sixth side, the fifth and sixth sides facing parallel to the main linear axis of the linear body;
   a hardened steel bushing carried within the bushing bore of the bushing block body having the bushing axis perpendicular to the main linear axis of the linear body;
   a lock down threaded member for extending through the securing through bore of the bushing block body and having a first end having a head which cannot pass through the securing through bore of the bushing block body and a second threaded end; and
   a nut having threaded bore and of a size to axially slide within the slot of the first side of the linear body but such that the nut cannot turn about its threaded bore, the threaded bore of the nut for being engaged by the second threaded end of the lockdown threaded member.

4. The cabinet assembly bore indexing tool as recited in claim 1 and wherein at least one of the spacer assemblies further comprises:
   a spacer body having a first end and an opposite second end, a distance between the first and second ends of the spacer body set to a nominal width of material used to construct cabinets such that the resulting center of the bushing axis will approximate the width of material used to construct cabinets as located relative to the lateral indexing bar spaced through to the linear body by the spacer body, through to the bushing block with reference to the linear body.

5. The cabinet assembly bore indexing tool as recited in claim 4 and wherein at least one of the spacer assemblies further comprises:
   a spacer threaded member having a first end and a second end connected to an attached slot member such that the attached slot member can translate through but cannot turn nor allow threaded member to turn, the first end of the spacer threaded member extending through the spacer body and through a slot carried by the lateral indexing bar; and
   a lateral indexing bar lock knob for engaging the spacer threaded member and to urge and lock the lateral indexing bar against the spacer body.

6. The cabinet assembly bore indexing tool as recited in claim 1 and further comprising:
   a indexing disc affixed with respect to one of the first and second ends of the linear body to index the linear body against a front face of cabinet material.

7. The cabinet assembly bore indexing tool as recited in claim 6 and wherein the indexing disc is attached to one of the first and second ends of the linear body by a threaded member engaging a threaded bore formed in the linear body.

8. The cabinet assembly bore indexing tool as recited in claim 1 wherein the linear body is an extrusion.

9. The cabinet assembly bore indexing tool as recited in claim 1 wherein at least one of the plurality of bushing blocks is sized to a first size to form a dowel bore and at least another one of the plurality of bushing blocks is sized a second size to form a threaded fastener and wherein the first size is different from the second size.

10. A cabinet bore forming kit, including the cabinet assembly bore indexing tool as recited in claim 1 and further comprising:
   a bore forming chuck having a cylindrical body having a first end having a drill bit bore for fitting a drill to protrude a pre-determined amount from the first end of the bore forming chuck, and a second end having a drill adaptor, the cylindrical body having a plurality of set screws each carried in its corresponding set screw bore extending from an exterior of the cylindrical body the inside of the drill bit bore to facilitate locking a drill bit the pre-determined amount from the first end of the bore forming chuck.

\* \* \* \* \*